United States Patent
Mackell et al.

(10) Patent No.: US 11,356,488 B2
(45) Date of Patent: Jun. 7, 2022

(54) FRAME SYNCHRONOUS RENDERING OF REMOTE PARTICIPANT IDENTITIES

(71) Applicant: Cisco Technology, Inc., San Jose, CA (US)

(72) Inventors: Paul Thomas Mackell, Gjettum (NO); Christian Fjelleng Theien, Asker (NO); Rune Øistein Aas, Lysaker (NO)

(73) Assignee: CISCO TECHNOLOGY, INC., San Jose, CA (US)

( * ) Notice: Subject to any disclaimer, the term of this patent is extended or adjusted under 35 U.S.C. 154(b) by 161 days.

(21) Appl. No.: 16/393,119

(22) Filed: Apr. 24, 2019

(65) Prior Publication Data
US 2020/0344278 A1    Oct. 29, 2020

(51) Int. Cl.
| | |
|---|---|
| *G06F 15/16* | (2006.01) |
| *H04L 65/1083* | (2022.01) |
| *H04L 65/403* | (2022.01) |
| *G10L 25/57* | (2013.01) |
| *G10L 17/00* | (2013.01) |
| *H04L 12/18* | (2006.01) |
| *H04N 7/15* | (2006.01) |
| *G06V 20/20* | (2022.01) |

(Continued)

(52) U.S. Cl.
CPC .......... *H04L 65/1083* (2013.01); *G06V 20/20* (2022.01); *G06V 20/49* (2022.01); *G06V 40/172* (2022.01); *G10L 17/00* (2013.01); *G10L 25/57* (2013.01); *H04L 12/1813* (2013.01); *H04L 65/403* (2013.01); *H04N 7/15* (2013.01)

(58) Field of Classification Search
CPC ............... H04L 65/403; H04L 12/1813; H04L 65/1083; H04N 7/15; G06K 9/00288; G06K 9/00671; G06K 9/00765; G10L 17/00; G10L 25/57

USPC .......................................................... 709/204
See application file for complete search history.

(56) References Cited

U.S. PATENT DOCUMENTS

| | | |
|---|---|---|
| 6,877,134 B1 | 4/2005 | Fuller et al. |
| 9,386,270 B2 | 7/2016 | Griffin et al. |

(Continued)

OTHER PUBLICATIONS

Adrian Rosebrock, "OpenCV Face Recognition", Sep. 24, 2018, 30 pages.

(Continued)

*Primary Examiner* — Imad Hussain
(74) *Attorney, Agent, or Firm* — Edell, Shapiro & Finnan, LLC

(57) ABSTRACT

During an online meeting, captured video content generated at an endpoint is analyzed. A participant at the endpoint is identified from the captured video content utilizing face recognition analysis of an isolated facial image of the participant within the captured video content. Identified participant information is generated, modified and/or maintained in response to one or more changes associated with the captured video content, where the one or more changes includes an identification of each participant at the endpoint and/or a change in location of one or more identified participants at the endpoint. In response to a determination of one or more criteria being satisfied, the identified participant information is provided in video content for transmission to a remote endpoint (to facilitate display of identifiers for one or more identified participants in the display at the remote endpoint).

18 Claims, 8 Drawing Sheets

(51) Int. Cl.
*G06V 20/40* (2022.01)
*G06V 40/16* (2022.01)

(56) References Cited

U.S. PATENT DOCUMENTS

| | | |
|---|---|---|
| 9,414,013 B2 | 8/2016 | Kenoyer |
| 9,445,047 B1 | 9/2016 | Frueh et al. |
| 2004/0263636 A1 | 12/2004 | Cutler et al. |
| 2005/0080849 A1* | 4/2005 | Wee .................... H04L 65/4038 709/204 |
| 2009/0123035 A1 | 5/2009 | Khouri et al. |
| 2010/0085415 A1* | 4/2010 | Rahman .................... G01S 3/80 348/14.08 |
| 2011/0096135 A1 | 4/2011 | Hegde et al. |
| 2013/0294594 A1 | 11/2013 | Chervets et al. |
| 2014/0104374 A1* | 4/2014 | Buckler .................... H04N 7/15 348/14.08 |
| 2014/0192138 A1* | 7/2014 | Kenoyer .................. H04N 7/14 348/14.07 |
| 2016/0071520 A1* | 3/2016 | Hayakawa .............. G10L 17/04 704/247 |
| 2017/0244931 A1* | 8/2017 | Faulkner ............... H04L 65/601 |
| 2018/0232566 A1 | 8/2018 | Griffin et al. |
| 2019/0215464 A1* | 7/2019 | Kumar ................. H04N 5/2628 |
| 2020/0082551 A1* | 3/2020 | Steiner .................... G06T 7/136 |

OTHER PUBLICATIONS

Face-Rec, "Face Recognition Homepage", Last update: Jan. 24, 2021, 1 page; https://www.face-rec.org/.

* cited by examiner

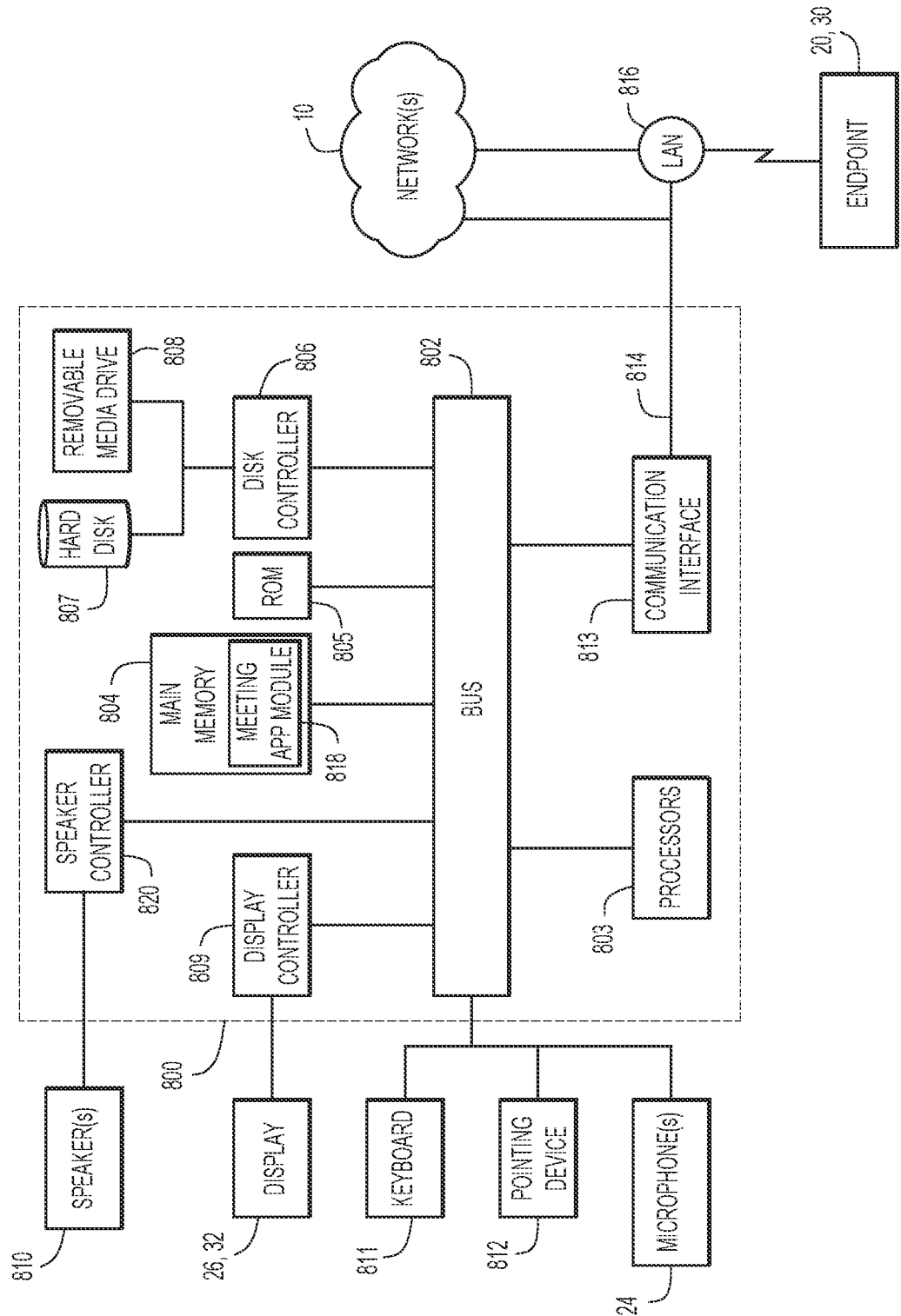

FRAME SYNCHRONOUS RENDERING OF REMOTE PARTICIPANT IDENTITIES

TECHNICAL FIELD

The present disclosure relates to enhancement of video conferencing by providing real-time identification of participants within an online meeting.

BACKGROUND

In an endpoint that comprises a video conference room or meeting room that accommodates multiple people, it can often be difficult to remember the names of attendees or participants in the meeting, particularly for remote attendees (i.e., participants at remote endpoints engaged in the online meeting). For example, when a particular participant is speaking, it would be useful to identify that participant and/or other participants in the meeting room during the session (e.g., in situations in which one might want to chat with a participant, or address that participant directly by name). This can be a challenge, particularly in scenarios in which video content associated with a video room with multiple participants is changing scenes or cropping images. To enhance the experience at the recipient end of the video content (i.e., a remote participant), it is desirable to enable automatic and correct identification of participants in a meeting room, in which identifiers associated with participants (e.g., name labels) are synchronous with the participants in consecutive video frames, even during the occurrence of movements of participants, scene changes and/or crop changes in the video content.

BRIEF DESCRIPTION OF THE DRAWINGS

FIG. 8 is an example embodiment of a computing device that can be used for any of the endpoints in the system of FIG. 1 to facilitate engaging in an online meeting and performing operations associated with the online meeting as described herein.

DESCRIPTION OF EXAMPLE EMBODIMENTS

Overview

Figure 1:
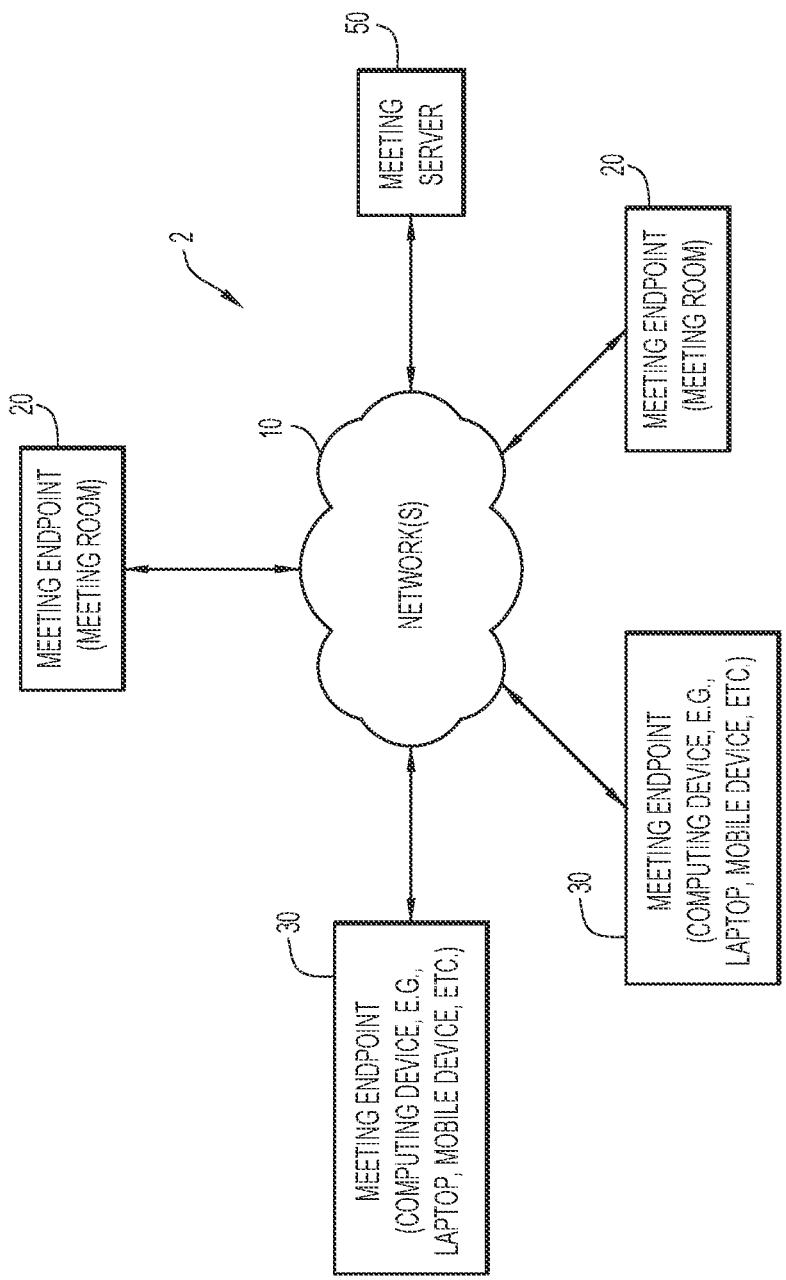
FIG. 1 depicts a schematic block diagram of an example embodiment of a networking environment that facilitates hosting of an online meeting between multiple endpoints.

In example embodiments, a method comprises analyzing captured video content generated in at an endpoint during an online meeting. A participant is identified at the endpoint from the captured video content utilizing face recognition analysis of an isolated facial image of the participant within the video content. Identified participant information is generated, modified and/or maintained in response to one or more changes associated with the captured video content, where the one or more changes comprises one or more of the following: an identification of each participant at the endpoint, and a change in location of one or more identified participants at the endpoint (including when an identified participant is no longer within a view). In response to a determination of one or more criteria being satisfied, the identified participant information is provided in video content for transmission to a remote endpoint.

In other example embodiments, an apparatus comprises memory configured to store instructions including one or more applications that support online meetings with endpoints over a network, a display to display video content during an online meeting, one or more cameras to capture video content at an endpoint during the online meeting, a communication interface configured to enable communications over a network, and a processor to execute and control operations of the one or more applications so as to perform the following operations: during the online meeting, analyze captured video content from the one or more cameras, identify a participant at the endpoint from the captured video content utilizing face recognition analysis of an isolated facial image of the participant within the captured video content, generate, modify and/or maintain identified participant information in response to one or more changes associated with the captured video content, where the one or more changes comprises one or more of the following: an identification of each participant at the endpoint, a change in location of one or more identified participants at the endpoint, a change in a region of interest (ROI) within the captured video content, a scene change for one or more video frames within the captured video content, and a crop change for one or more video frames within the captured video content, and, in response to a determination of one or more criteria being satisfied, provide the identified participant information in video content for transmission over the network to a remote endpoint. The identified participant information is provided in the video content in response to a determination of the one or more criteria being satisfied on a video frame-by-frame basis.

In further example embodiments, one or more computer readable storage media encoded with software comprising computer executable instructions and when the software is executed operable to: during an online meeting, analyze captured video content and captured audio content generated at an endpoint, identify a current speaker at the endpoint based upon the captured audio content, identify a participant at the endpoint from the captured video content utilizing face recognition analysis of an isolated facial image of the participant within the captured video content, determine an identified participant that is the current speaker at the endpoint based upon a comparison of the captured audio content and the captured video content, generate, modify and/or maintain identified participant information in response to one or more changes associated with the captured video content, where the one or more changes comprises one or more of the following: an identification of each participant at the endpoint, a change in location of one or more identified participants at the endpoint, and a determination of an identified participant that is the current speaker at the endpoint, and, in response to a determination of one or more criteria being satisfied, provide the identified participant information in video content for transmission to a remote endpoint.

Example Embodiments

Example embodiments are described herein that automatically identify participants at an endpoint (e.g., a meeting room at an endpoint) within a video conference or online meeting and further allow remote endpoint users to provide identifier labels for the participants in a conference. As further described herein, the participant identifier labels that can be provided within the video content of the meeting are maintained in close proximity with participants even when the participants are moving and/or the video content may be undergoing various scene changes (e.g., due to a change in region of interest, such as a participant is moving within a conference or meeting room at an endpoint), or there is a crop change that is implemented at the video transmission end or at the receiver end). This provides a better viewing experience for the remote endpoint participant viewing the content while also maintaining accuracy or synchronous frame rendering of the label identifier(s) with one or more participants in real-time during the ongoing meeting.

An example embodiment of a system that supports online meetings such as video meetings/conferences (as well as sharing or exchange of content) between attendees at meeting endpoints is depicted in the schematic diagram of FIG. 1. As used herein, the term "online meeting" or "online meeting session" or "online conference" refers to a communication between at least two meeting endpoints that can include audio and/or video content (e.g., a meeting where video images of attendees at different meeting endpoints are captured (i.e., obtained and recorded) and provided to other attendee devices as part of the communication) as well as the sharing of other content (e.g., sharing of files or documents, such as word processing documents, spreadsheet documents, slide presentations, etc., sharing of images and the sharing of any other types of content). In an online meeting session, an attendee at a meeting endpoint may be designated as a speaker or presenter of content, and the speaker or presenter designation can change throughout the online meeting.

Referring to FIG. 1, a system 2 comprises a network 10 that facilitates communications and exchange of communications (e.g., audio and/or video), such as online video meetings, and sharing of content (e.g., sharing of documents or files, images, video, etc.) between any number of meeting endpoints 20, 30 via at least one host server device 50. The number of meeting endpoints 20, 30 and the single host server device 50 depicted in FIG. 1 is provided for example purposes only, and it is noted that the network 10 can support communications and sharing of content between any suitable number of endpoints of various types hosted by any suitable number of server devices (e.g., one or more host server devices). Examples of types of networks that can be utilized within system 2 include, without limitation, any one or more of local or wide area networks, Internet Protocol (IP) networks such as intranet or internet networks, telephone networks (e.g., public switched telephone networks), wireless or mobile phone or cellular networks, and any suitable combinations thereof.

Meeting endpoints that can engage in a video meeting (also referred to as a video conference) or any other communication over the network 10 can be of any one or more suitable types and can include any number of persons or attendees at a meeting endpoint. As a general example, each endpoint can comprise any suitable computing device or combination of two or more computing devices, such as personal computer (PC) devices (including stationary or desktop computers, laptops, etc.), local server devices, or any other suitable types of mobile computing devices (e.g., note pads, tablets, personal data assistant (PDA) devices, cell phones or smart phones, and any other types of portable media player devices). For example, a meeting endpoint can comprise a meeting room 20 that accommodates multiple people or participants for a meeting. A meeting endpoint can also comprise a personal computing device that typically accommodates a single person or participant (e.g., a desktop, a laptop, a cellular phone or other mobile computing device). As described in further detail herein with regard to FIG. 8, each of the endpoint computing devices include suitable processors, input and output (I/O) devices, memory and software as described herein to facilitate communications with other endpoint computing devices over the network 10 and via host server(s) 50, including engaging in online meetings (e.g., a video conference or meeting) with sharing of content during such meetings.

Server devices 50 can be any suitable types of stationary or other types of computing devices capable of hosting and managing online meetings and also, optionally, other types of communication sessions between computing devices of endpoints 20, 30 (e.g., email, instant messaging or SMS communications, posting of content in blogs or other virtual environments, support of chat rooms, communities or other forms of social networking platforms). The server device(s) 50 also support(s) exchange of content in any suitable format, such as utilizing Real-time Transport Protocol (RTP) and/or Real-time Transport Control Protocol (RTCP), where data such as audio and/or video content is transported in packets from an endpoint where such content is generated (and compressed/encoded, e.g., utilizing a H.264/MPEG-4 compression standard to encode the packets) to a remote endpoint where the audio and/or video content is received (and uncompressed/decoded).

The computing devices of the endpoints and one or more hosting servers can utilize any suitable operating systems (e.g., Android, Windows, Mac OS, Blackberry OS, Linux, etc.) to facilitate interaction, communications and sharing of content between endpoints 20, 30 over the network 4. In addition, the techniques described herein for engaging in online meetings and the sharing of content within such meetings can be implemented utilizing any suitable types of commercial software products and associated services that support such communications and sharing of content between attendee devices. A non-limiting example of a platform of software products and associated services with which the online meetings described herein can be implemented is commercially available under the trademark Cisco WebEx (Cisco Systems, Inc.).

Figure 2:
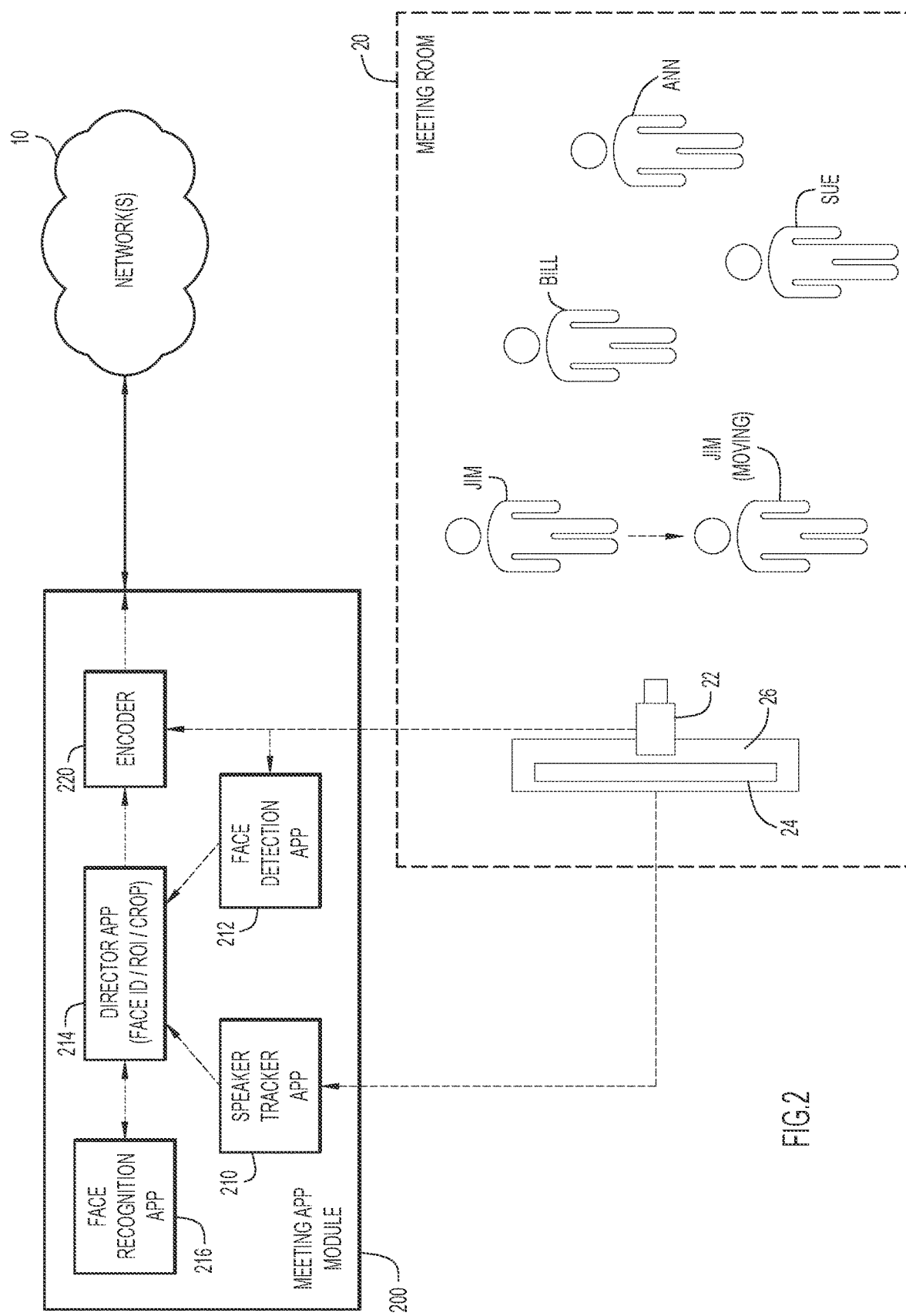
FIG. 2 depicts a schematic view of an endpoint for the networking environment of FIG. 1 that comprises a video conference room including components that generate video content for a video conference session and also facilitate frame synchronous rendering of participant identities for an online meeting in accordance with embodiments described herein.

An example embodiment of a meeting endpoint for the system 2 comprises a meeting room 20 (e.g., a telepresence room) configured to accommodate a plurality of participants as depicted in FIG. 2. The meeting room 20 includes one or more computing devices as well as other audio and video components that facilitate engaging in an online meeting. The one or more computing devices associated with the meeting room 20 can be physically present within the meeting room or, alternatively, located outside of the meeting room. In particular, the meeting room 20 includes one or more cameras (represented by camera 22 in FIG. 2) that can be of any suitable types (e.g., high definition or HD digital cameras providing a suitable resolution, such as 720p, 1080i, or 1080p), capture video images or video frames at any one or more suitable frame rates (e.g., 15 frames per second or fps, 24 fps, 30 fps, 60 fps, etc.) and are suitably oriented and/or movable (e.g., automatically or manually movable) to capture video images at one or more locations within the room in which participants are located, where the one or more cameras capture video images within the areas of the room for processing by a meeting software application module 200 of one or more computing devices associated with the meeting room 20. In an example embodiment, the meeting room 20 can include a plurality of cameras that are configured to capture video frame images of the entire meeting room, where one camera may focus on one participant (e.g., an identified speaker in the room), cropping the image to provide a full view or a close up view of that participant, while another camera may capture video frame images of other areas (e.g., areas including other participants) of the room. Switching views or scenes of the video content between two or more cameras for an online meeting automatically and dynamically based upon a changing region of interest (ROI), such as changing of the current active speaker from one identified participant to another identified participant in the meeting room. An example embodiment of a camera system utilizing a plurality of cameras to capture different image views (so as to facilitate changing views or scenes during an ongoing meeting) is commercially available under the tradename Cisco TeleP-resence SpeakerTrack (Cisco Systems, Inc.).

The meeting room 20 also includes one or more video displays or display screens, such as LCD displays (shown generally as display screen 26), to display video content from one or more remote endpoints engaged in the online meeting. The meeting room 20 further includes a microphone array 24 comprising a plurality of microphones suitably positioned within the meeting room to detect and capture/record audio content at various precise locations within the meeting room (e.g., capturing and recording audio content of people/participants speaking and/or other noises within the room during the video meeting).

While not depicted in FIG. 2, the meeting room 20 also includes one or more speakers for outputting audio content provided by remote endpoints engaged in the online meeting. The meeting room 20 can also include any suitable number and types of furniture items including, without limitation, desks, chairs, tables, podiums, etc.

As described herein, the audio content originating in the meeting room and captured by the microphone array 24 can be used to determine a location of one or more participants within the room based upon detection of the voice of the participant when they are speaking. Each of the one or more cameras 22, one or more video display screens 26, and the microphone array 24 is suitably connected or coupled with one or more computing devices (disposed within the meeting room 20 or, alternatively, at a location separate from the meeting room) to facilitate operation of such devices by the computing system as well as receipt of audio and video content associated with the meeting from each camera and the microphone array as well as output of audio content to a speaker and display of video content to a display screen associated with the meeting.

Each computing device of the meeting room 20 can have a configuration as described herein with reference to FIG. 8, and the one or more computing devices of the meeting room 20 include a software module (or a plurality of software modules) comprising one or more software applications (also referred to as applications) that facilitate control of operations within the meeting room associated with initiating, engaging in and terminating an online meeting session. For example, the computing device(s) of a meeting room 20 can include a meeting application software module (or meeting app module) 200 that includes one or more software applications that perform functions associated with an online meeting, including communications with other endpoints engaged in the meeting over the network(s) 10 (including sending and receiving of audio content, video content and/or other content associated with the online meeting, displaying video content via the display screen(s) in the meeting room, outputting audio content via the speaker(s) in the meeting room, and capturing/recording audio content and/or video content via the microphone array and/or camera(s) in the meeting room for processing and transmission to other endpoints engaged in the online meeting).

The meeting application module 200 includes one or more software applications that facilitate face detection of one or more participants in the meeting room 20, room coordinate locations of one or more speaking participants in the meeting room 20, and identification of one or more participants in the room and their room coordinate locations based upon the face detection analysis as well as the identified locations of speaking participants in the meeting room 20. This combination of detection features facilitates providing an automatic identifier (e.g., a label including participant name) associated with identified participants in the meeting room and/or identified speaking participants in the meeting room during the online meeting.

Referring again to FIG. 2, the one or more software applications of the meeting app module 200 includes a speaking participant or speaker tracker application 210 that analyzes the captured/recorded audio content received by the meeting room computing device(s) from the microphone array 24 during the online meeting. Based upon the spacing orientations of the microphones within the array 24, each microphone capturing audio content is assigned to or correlated with a precise location within the meeting room, thus enabling the identification or mapping of a precise location within the meeting room from which a sound occurs. For example, when a participant in the meeting room is speaking (e.g., the participant is the current speaker), the precise location of that speaking participant within the meeting room can be identified based upon audio content captured by the microphone array 24 and analyzed utilizing the speaker tracker application 210. This identification can be utilized in order to provide a number of features associated with the online meeting, such as establishing or identifying a region of interest (ROI) for captured/recorded video content in the meeting room to be utilized by the meeting room endpoint (e.g., for directing one or more cameras to capture video images at such ROI, for use by remote endpoints receiving the video content in scenarios in which the cropping of video images in the ROI is desired at the remote endpoint, etc.). The identification of a precise location or mapping within the meeting room 20 of a speaking participant can also be utilized for purposes of providing a label identifier (e.g., name identifier) of the current meeting participant speaker in the displayed video content at a remote endpoint as described herein.

The one or more software applications of the meeting application module 200 further includes a face detection application 212 that uses conventional, commercially available or any other suitable type of face detection software that is capable of automatically identifying one or more faces within a video frame and isolating or isolating and extracting the facial image from the video frame for each detected face. The face detection application 212 can further detect the precise position and size of each detected face within a captured video frame so as to identify precise locations of participants with detected faces within the meeting room. A face recognition application 216 of the one or more applications of module 200 utilizes the extracted facial images to obtain an identity (e.g., a name) of one or more participants in the meeting room 20. For example, the face recognition application 216 can facilitate communication of the computing device(s) (e.g., over the network(s) 10) with a face recognition service (e.g., a remote service) that is capable of comparing the extracted facial image with a database of facial images having known identities to obtain a match. Alternatively, the face recognition service can comprise a local database (e.g., data stored within the computing device (s) of the meeting room 20) that contains the known identities of facial images (e.g., facial images of all employees in a company).

A director application 214 comprises one or more software applications of the meeting application module 200 and controls certain operations associated with the online meeting. For example, the director application 214 utilizes data obtained and/or generated by the speaker track application 210, face detection application 212, and face recognition application 216 to determine which participants are identified in the video content as well as which of the identified participants in the video content is a speaker (e.g., a current presenter or active speaking participant in the online meeting). A determination of which identified participant within the meeting room 20 is currently speaking within a video frame is determined by the director application 214 based upon a comparison of the known location coordinates of an identified participant with the known location coordinates of an identified speaking participant in the meeting room (where a match in same spatial position as defined by the two sets of coordinates within the meeting room identifies which known participant is a current presenter or active speaker). The director application 214 further utilizes this information to determine (e.g., based upon where a current presenter or active speaker is located and/or where a sound is currently being generated in the meeting room) a region of interest (ROI) within and/or a precise location in which to crop one or more video frames and/or establish a scene for video content during any given time period.

Based upon the identified ROI, the director application 214 can optionally modify the video content to make a scene change and/or crop one or more video frames prior to being transmitted for display to other/remote endpoints engaged in the online meeting. A region of interest (ROI) can represent any portion of one or more video frames that includes one or more participants. In particular, a ROI can represent a data structure that includes a portion of one or more video frames that includes an identified participant (e.g., coordinates within the one or more video frames representing where the identified participant is located) as well as any other information associated with the identified participant (e.g., the speaking status of the identified participant or whether the identified participant is a current speaker, a name of the identified participant, etc.). In scenarios where a plurality of participants have been identified in a meeting room and/or are present within a scene of the video content, a corresponding plurality of ROIs are created and maintained by the director application 214 (e.g., a ROI is created and maintained for each of Jim, Bill, Ann and Sue as depicted in FIG. 2).

A scene for the captured video content refers to an established number of ROIs (e.g., identified participants) within one or more video frames. A scene change can occur, e.g., when a number and/or location of one or more ROIs within a scene has changed. For example, a scene change can occur when a new participant enters the meeting room and is captured and identified in the video content, or when an identified participant leaves the room or is no longer captured in the video content, or when an identified speaking participant is moving during speaking (thus causing a movement in ROI location within captured video frames) which in turn can cause a change in the viewpoint image within the room to maintain the identified speaking participant within captured video content (e.g., a camera capturing video content within the meeting room is automatically moved to follow the speaking participant and/or video content being captured is changed from one camera to another camera within the meeting room). Scene changes can also occur based upon a change in magnification and/or resizing of the captured video content (e.g., magnifying the view of the identified current speaker) that results in a change in number of ROIs in the one or more video frames to be sent for display.

A crop of a video image (e.g., one or more video frames) refers to a selected part of the video image and can be, e.g., a full image captured by one or more cameras, or a smaller portion of one or more images captured by the camera(s). For example, cropping of video content can comprise removing one or more portions and/or resizing of the captured video frame images, such as providing a wide view, a close-up or magnification, a determined best view, etc. Cropping of video content can be implemented by the sender (e.g., utilizing the director application 214 of meeting room 20), e.g., to isolate one or more ROIs prior to display. Alternatively, or in combination with the sender modifying the video content prior to transmission to the remote endpoints, the identified participant information can be transmitted to remote endpoints to allow a remote endpoint the option of cropping (or further cropping) and/or resizing of the video content based upon the identified participant information.

The audio and/or video content (optionally modified video content) as well as information relating to identified participants and currently speaking participants (e.g., in the form of ROIs) is provided by the director application 214 of the meeting application module 200 to an encoder 220 that compresses and encodes the video content (e.g., using H.264/MPEG-4 compression) prior to being transmitted (e.g., utilizing RTP or RTCP) via the network(s) 10 to other/remote endpoints that are engaged in the online meeting. As further described herein, the director application 214 provides information in the encoded video content regarding one or more ROIs (each ROI including information about an identified participant, the speaking status of the identified participant, and current location or coordinates of the identified participant within the video frame, where such ROI information is also based upon any scene change and/or any crop information associated with the video frame), where such information can be used by the remote endpoints receiving the encoded video content to provide label identifiers in close proximity to identified participants regardless of whether the video images are changing due to scene changes and/or cropping of the video images.

Figure 3:
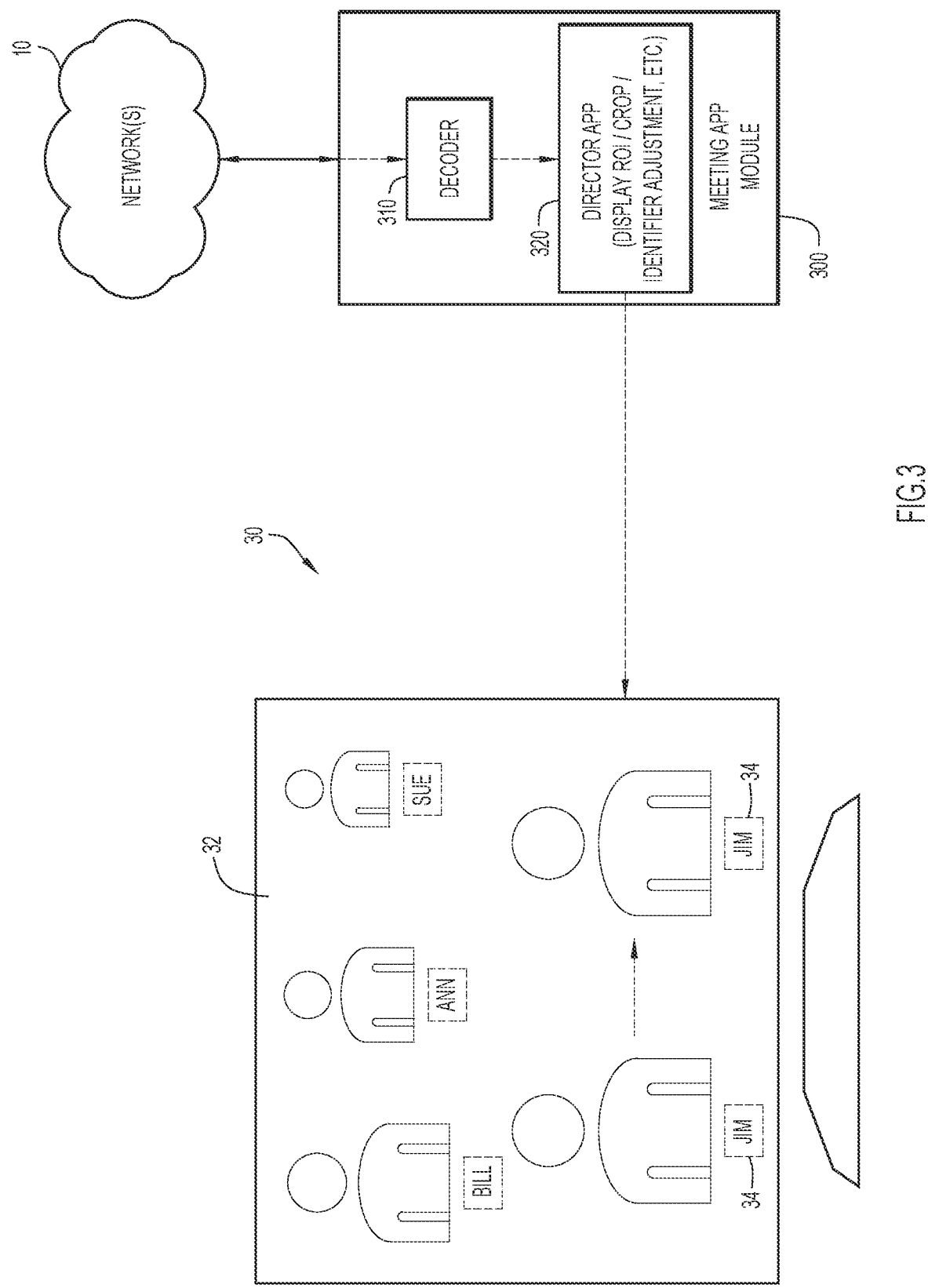
FIG. 3 depicts a schematic view of an endpoint for the networking environment of FIG. 1 that comprises an endpoint participant of the video conference session which receives video content from the endpoint of FIG. 2.

Referring to FIG. 3, an example embodiment is depicted of another endpoint 30 for the system 2 that is capable of engaging in an online meeting, where such endpoint 30 can be a personal computing device (e.g., a mobile phone, a desktop, a laptop, etc.) that is typically configured to accommodate a single participant. Like the computing device(s) of the meeting room 20, the personal computing device of the endpoint 30 can also have a configuration as described herein with reference to FIG. 8. The endpoint 30 includes a video display or display 32 to display video content received from another endpoint of the online meeting, such as the encoded video content from the meeting room 20. While not depicted in FIG. 3, the computing device of endpoint 30 can further include other suitable hardware and associated software to facilitate engaging in the online meeting including, without limitation, one or more cameras (for capturing and transmitting video content of the participant at the endpoint 30), one or more microphones (for capturing and transmitting audio content generated by the participant at endpoint 30), and one or more speakers (to facilitate transmission of audio content provided by one or more other endpoints engaged in the online meeting).

The computing device of endpoint 30 further includes a meeting application module 300 (or a plurality of modules) including one or more software applications to facilitate engaging in initiating, engaging in and terminating operations associated with an online meeting. In particular, the meeting application module 300 includes a decoder 310 to decompress and decode the audio and/or video content provided by the endpoint transmitting such content during the online meeting. A director application 320 of the meeting application module 300 comprises one or more software applications to control certain operations associated with the online meeting. For example, the director application 320 receives the decoded/decompressed audio and/or video content, including information provided in such content regarding one or more ROIs, and identified participants including a current presenter/currently active participant speaker.

Based upon this information, the director application 320 associates name identifiers or labels associated with each identified participant in the video content received from the meeting room endpoint 20, and the video content displayed by the display 32 can be selectively modified to include the identifiers 34 (e.g., name labels) for one or more of the identified participants (e.g., as a text box providing the participant's name directly above or below and/or in close proximity to the participant's face). For example, the video content displayed on the display screen 32 at endpoint 30 can include a name label identifier 34 that is automatically (via the director application 320, and based upon identified participant information provided in video content from the meeting room endpoint 20 as described herein) positioned in close proximity to each identified participant or only to one or more designated participants (e.g., only to the identified participant who is the currently active speaker/current speaker or current presenter of the online meeting). In other example embodiments, the director application 320 can control operations of a graphical user interface (GUI) associated with the video content that allows a user to selectively choose one or more participants to have name labels displayed for the selected participant(s). In one example, the GUI can be configured to allow a user selection choosing a name label to be displayed for only the current presenter/ current actively speaking and identified participant. The GUI can also be configured to provide a pull down menu listing of all the names of the identified participants that allows the user to selectively choose which of identified participants will have name labels displayed in proximity to these identified participants.

In the example embodiment depicted in FIGS. 2 and 3, meeting room 20 includes a plurality of participants (Jim, Bill, Ann and Sue) who have been identified utilizing the one or more software applications of the meeting application module 200. The display 32 of the endpoint 30 depicts an example of how each identified participant can have an identifier in the form of a name label displayed for each identified participant (i.e., via the text boxes in dashed lines below the displayed participants). As also depicted in this example, a participant (Jim), who is an identified current speaker in the online meeting, has moved locations (as indicated by the dashed arrow between the two participant images representing Jim in the meeting room 20 and on the display 32). As can be seen in the display 32 of endpoint 30, the name label associated with the moving participant (Jim) also moves and remains in close proximity and directly below the participant's face in correspondence with the participant's movements within the meeting room 20. Alternatively, the name identifier or name label can be provided at any suitable location in relation to the identified participant such that it is understood to be associated with the identified participant.

The ability of the system 2 to maintain a displayed name identifier, such as a name label, in the same or substantially similar/synchronous frame alignment and any desired proximity with an identified participant's face and/or body during participant movements, scene changes and/or crop changes in the video content provided by the meeting room 20 can be achieved utilizing an algorithm applied by the one or more software applications of the meeting application module 200 and, in particular, the director application 214. The algorithm defines criteria by which identified participant information (e.g., in the form of ROIs) is provided as metadata within the compressed and encoded audio and/or video content sent in a data stream from the meeting room endpoint 20 to other endpoints (e.g., endpoint 30) engaged in the online meeting. In particular, in example embodiments, metadata providing information about identified participants (e.g., in the form of ROIs), which includes participant movements (e.g., in the form of changing location coordinates of the identified participant within consecutive video frames), scene changes and crop changes, is only provided within a compressed and encoded video frame when such criteria has been met or is verified. The criteria associated with providing metadata in the compressed and encoded video frame can be based upon one or more of the following: 1. Whether there is a certain change in one or more ROIs between two or more captured video images/ video frames (e.g., any addition or subtraction of ROIs between two or more video frames, such as when a new identified participant enters the meeting room or an identified participant leaves the meeting room or is not captured in the one or more video frames, certain movements of one or more participants, any change in current speaking participant, etc.); 2. Whether there is a scene change or crop change between two or more captured video frames; and 3. Time lapsed between when metadata was last sent in a compressed and encoded video frame within the data stream. When using, e.g., H.264/MPEG-4 as the format for compression/encoding of the video frames, metadata can be embedded as one or more supplemental enhancement information (SEI) messages within H.264 packets of the data stream.

Figure 4:
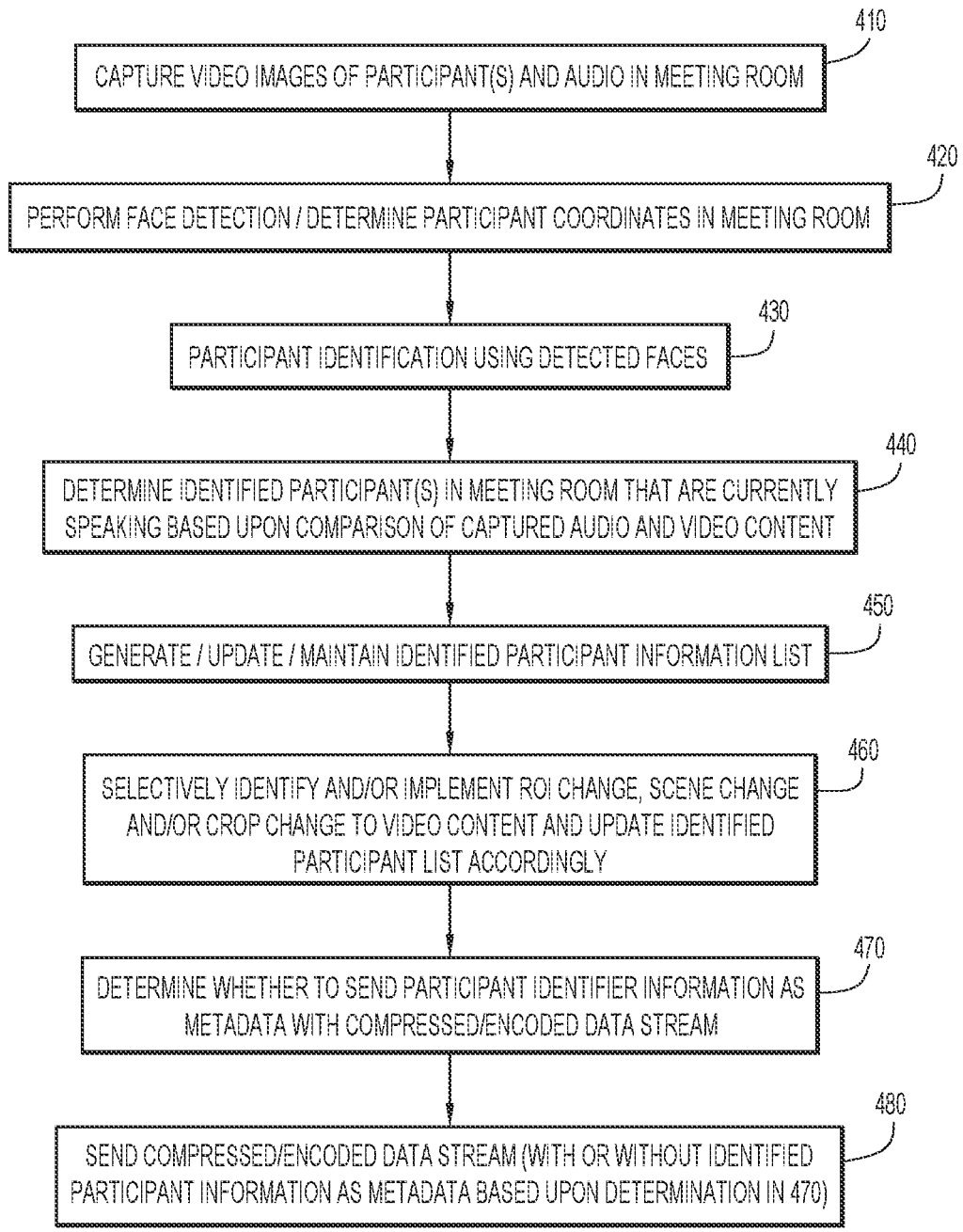
FIG. 4 depicts a flowchart of example process steps associated with transmission of video content from a meeting room at an endpoint to remote endpoints engaged in an online meeting so as to achieve frame synchronous rendering of participant identities during the online meeting utilizing the networking environment of FIG. 1.
Figure 5:
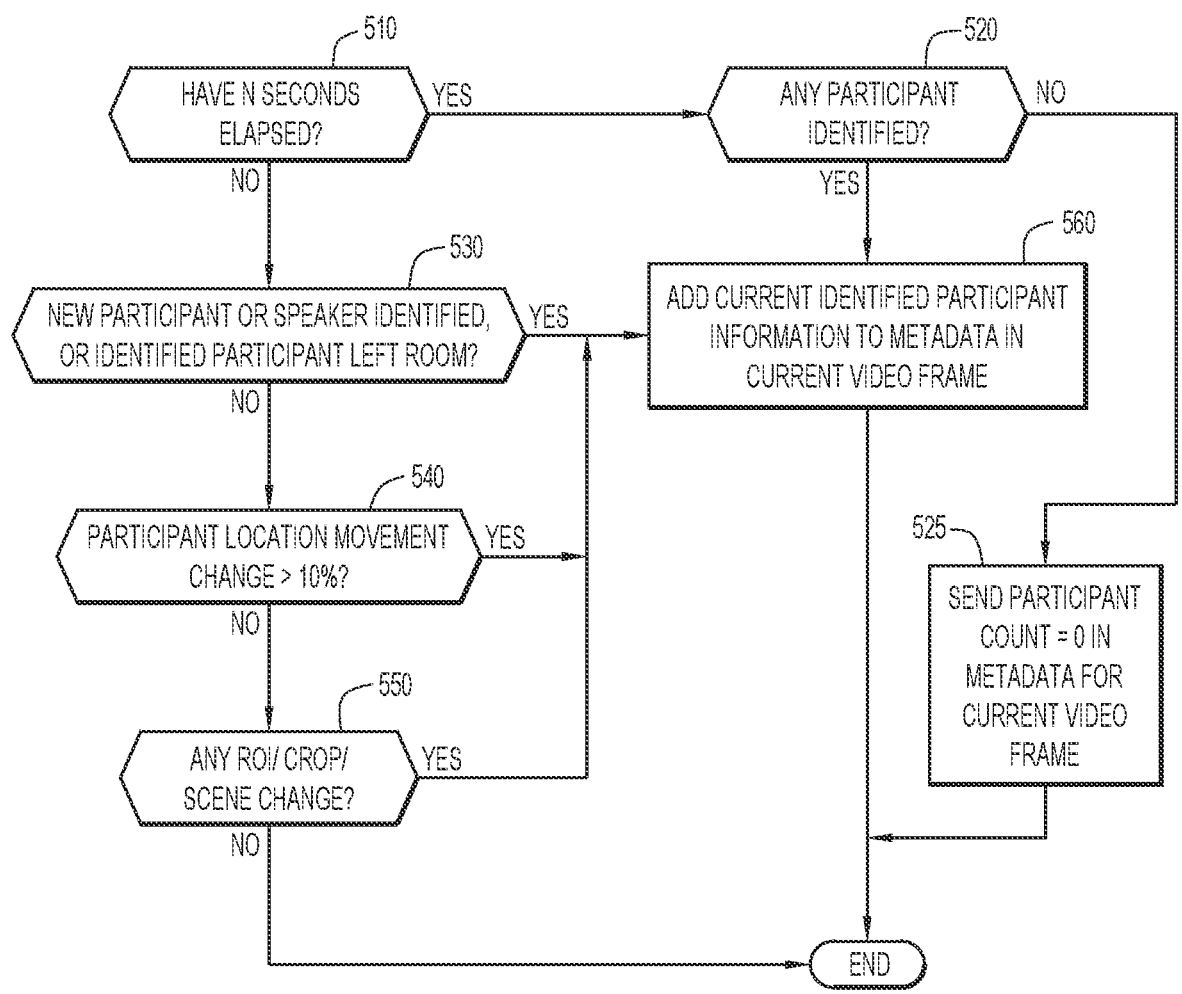
FIG. 5 depicts a flowchart of example process steps for determining when to provide participant identification information in compressed and encoded video frames of video content sent from a meeting room to the remote endpoints engaged in the online meeting.
Figure 6:
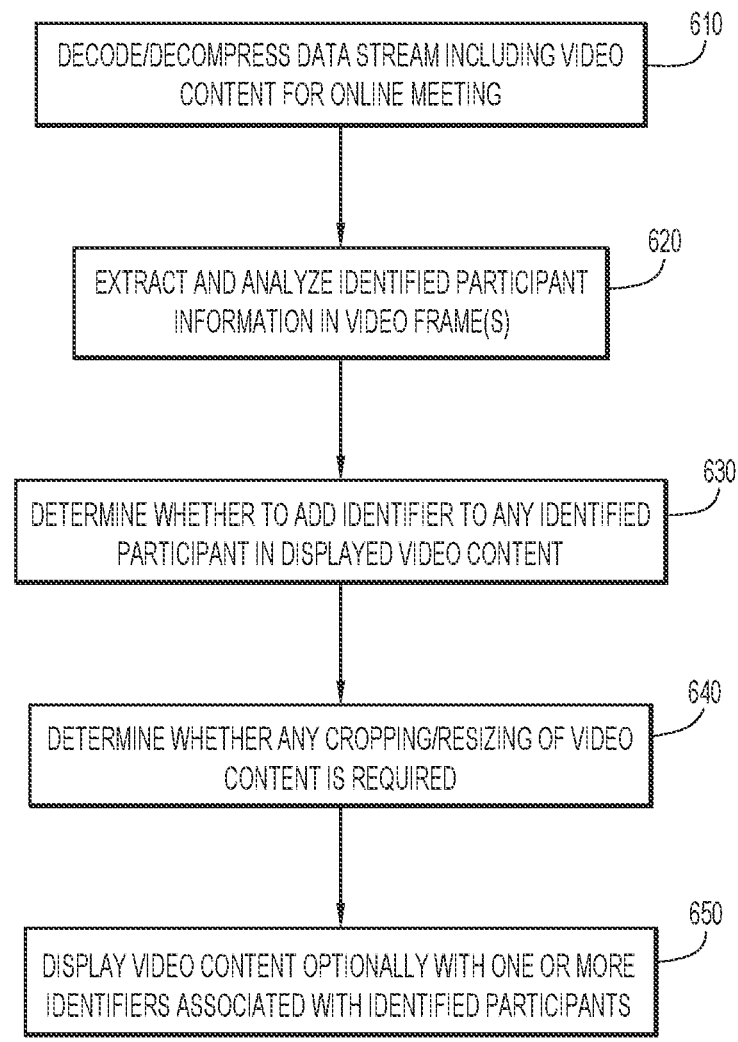
FIG. 6 depicts a flowchart of example process steps associated with receiving and processing and displaying video content with participant identifiers at a remote or content receiving endpoint engaged in an online meeting so as to achieve frame synchronous rendering of participant identities during the online meeting utilizing the networking environment of FIG. 1.

An example embodiment of generating and transmission of video and/or audio content from a meeting room 20 to an endpoint 30 (or any other endpoint) engaged in an online meeting is described with regard to FIGS. 1-3 as well as the flowcharts of FIGS. 4-6. Referring to the flowchart in FIG. 4, at 410 video images including any participant are captured by the camera(s) 22 and audio content is captured by the microphone array 24 in the meeting room 20 and provided to the computing device(s) associated with the meeting room for analysis and processing by the meeting room application 200. At 420, face detection is performed utilizing the face detection application 212, and the coordinates within video frames associated with each detected face is determined, e.g., via the director application 214. In a scenario in which a participant enters the meeting room 20 but his or her face is facing away from the camera(s) 22, the face detection application 212 will not be capable of detecting a face. However, once the participant moves his or her head toward the camera(s) 22, face detection can then be obtained. At 430, participant identification of each detected face is obtained via the face recognition application 216 and/or the director application 214 (and further by accessing a face recognition service including a database with known facial images). In example embodiments, a participant count can be established, where a participant count is initially zero (pcount=0, or pcount=false) prior to any participant being identified in the meeting room. The participant count value can be modified each time a new participant is identified within the meeting room. For example, the participant count can be set with a numerical value (pcount=1 when one identified participant is in the meeting room, pcount=2 when two identified participants are in the meeting room, etc.) or a Boolean value (e.g., pcount=false when no identified participant is in the meeting room, pcount=true when at least one identified participant is in the meeting room). The participant count value can be provided in the video content to endpoints to provide an indication of whether there is any participant (and/or number of participants) within the room. This can allow a meeting endpoint, e.g., to clear any local list of information it may have regarding participant identifier information.

At 440, any identified participant that is a current speaker in the meeting room 20 is determined by a comparison of the audio content obtained from the microphone array 24 and the identified participant information (where room coordinates of a speaking participant that are determined based upon the captured audio content are matched with room coordinates of an identified participant determined from face detection of the captured video content).

At 450, a list of identified participant information is generated, modified and/or updated as needed and maintained (e.g., utilizing the director application 214), where the identified participant information list can be modified or updated on a video frame-by-frame basis. The list of identified participant information contains any suitable information associated with enabling remote endpoints to accurately display identifier information (e.g., name labels) in close proximity and in a synchronous manner with the identified participants during the online meeting. For example, the list of identified participant information includes identifier information associated with each identified participant (e.g., participant names), specific locations (meeting room coordinates) of each identified participant within the meeting room, information regarding which identified participant is the current active speaker within the meeting room, current locations of identified participants within the meeting room, and tracking movement information for any one or more identified participants within the meeting room. The list of identified participant information can be organized in the form of ROIs, where each ROI includes the information about an identified participant (current location/coordinates in one or more video frames, speaking or speaker status (i.e., whether the identified participant is currently speaking), and name of identified participant. The identified participant information can also include information regarding the current participant count (pcount) value, any scene change and/or crop change occurring between two or more video frames.

In example embodiments, tracking movements of one of more identified participants in the meeting room (e.g., utilizing the director application 214) can be achieved by comparing a current location of an identified participant with a baseline location for the identified participant in the meeting room. For example, once an identified participant is determined, the location of the identified participant can be set as the baseline location, saved as part of the ROI for that identified participant in the identified participant information list, and the identified participant's movements can be monitored over successive video frames. When an identified participant has moved within the meeting room such that the participant location exceeds a set distance from the baseline location (e.g., a 10% or greater change in location of the identified participant from the baseline location), the ROI for this identified participant can be modified to include a flag or indicator (e.g., so as to ensure that any name label or other identifier associated with the participant is moved so as to be synchronous with the participant movement in the video frames). When an identified participant has moved to a current location that is beyond a set distance from the baseline location and a flag or indicator has been set, the current location can then be set as the baseline location in the ROI for the participant within the identified participant information list.

When an identified participant leaves the meeting room during the online meeting, the meeting application module 200 (e.g., the director application 214) can also determine that the identified participant is no longer in the meeting room and can further delete or revise information associated with the identified participant from the identified participant information list. For example, an ROI associated with the identified participant can be deleted from the identified participant information list or, alternatively, marked with some indicator that the identified participant is no longer in the meeting room (so that the ROI associated with this identified participant need not be sent as part of the identified participant information in the metadata for the next one or more video frames). The participant count (pcount) value can also be modified based upon an identified participant leaving the meeting room. An indication that the identified participant is no longer in the meeting room can be determined, e.g., based upon change in movement of the identified participant to location that is at or beyond established boundary coordinates of the meeting room and/or the identified participant is no longer being captured by camera(s) 22 within one or more video frames being analyzed by the meeting application module 200.

As previously noted herein, the identified participant information list further maintains information relating to a scene, to any scene change and to any crop change between any two video frames as well as any modifications to the identified participant locations (e.g., modifications in room coordinates) based upon the crop or scene change. At 460, a scene change and/or a crop change can be implemented via the meeting application module 200 (e.g., utilizing the director application 214). A scene and/or crop change can be implemented based upon a ROI location changing within one or more video frames (i.e., an identified participant is moving within the meeting room) or a change in ROI information (e.g., new identified participant enters the room, an identified participant leaves the room or is no longer in a scene due to a scene change or crop change, or current room speaker changes). For example, a change in current active speaker (e.g., current active speaker changes from one known participant to another known participant) can result in a scene change and/or a crop change (e.g., a scene change in video content provided by one camera to another camera and/or a crop change in the video content via the meeting application module 200 to provide a better view of the identified participant who is the current speaker). A crop change can include a change in lens (e.g., changing between a wide angle, left, right or center) and also a change in crop type (e.g., full overview, best overview, close-up or magnification, etc.). Each time a crop change is made, coordinates of the cropped view (including width/height dimensions), including coordinates of identified participants within the cropped view are also determined and added to the ROIs of identified participants in the identified participant information. Similarly, a scene change (e.g., change from one camera view to another) may also result in a change of coordinates for one or more identified participants in the video content, and such changes in coordinates for the identified participants are also added to the ROIs for the identified participants. Further, a change in coordinates of an identified participant can occur, e.g., when an identified participant who is the current speaker moves a certain distance within the meeting room. A change in coordinates of an identified participant can also occur (independent of any scene or crop change) when the identified participant moves within the room, and the ROI associated with the moving identified participant is also modified to include the change in location coordinates of the moving identified participant. The identified participant information list is modified/updated based upon any ROI change, any scene change and/or any crop change associated with any video frame.

As previously noted herein, identified participant information (e.g., ROIs, scene information/scene changes and crop information/crop changes) can be added as metadata within compressed and encoded video frames being sent in the data stream to the remote endpoints. In example embodiments, the identified participant information is only added as metadata to a video frame under certain conditions. In particular, in order to minimize the amount of data or redundant data associated with identified participant information that might be sent to endpoints in a video content stream for the online meeting, the identified participant information is only sent as metadata with a video frame when one or more criteria is satisfied. This feature provides for a more efficient transfer of data for the online meeting while also ensuring accurate and frame synchronous linking or associating of identifiers with identified participants in the display of the online meeting.

At 470, a determination is made, utilizing an algorithm executed by one or more software applications of the meeting application module 200 (e.g., utilizing the director application 214), whether participant identifier information should be provided in one or more video frames that are compressed and encoded for transmission to remote endpoints engaged in the online meeting.

At 480, the one or more video frames are compressed and encoded for transmission (e.g., in a packet of data including the one or more encoded video frames) to a remote endpoint. Based upon the determination at 470 (and utilizing the algorithm as set forth in the flowchart of FIG. 5 and described herein), one or more video frames within the compressed/encoded data stream may or may not include metadata containing identified participant information (based upon whether certain criteria has been satisfied in the algorithm).

An example embodiment is depicted in the flowchart of FIG. 5 of an algorithm including certain criteria for determining whether to add identified participant information as metadata to a video frame in the online meeting data stream. The determination process is performed on a video frame-by-frame basis and utilizes the following criteria to determine whether to send identified participant information, when to send identified participant information, and what type of identified participant information to send as metadata in a compressed and encoded video frame. The criteria includes the following: whether a set time interval has elapsed (i.e., every N seconds of the online meeting, identified participant information is sent as metadata in a video frame), whether a newly identified participant has entered the meeting room and/or whether an identified participant has left the meeting room, whether the location of an identified participant has changed by a set distance (e.g., 10% or greater change in distance from the baseline location of the identified participant), and whether a ROI change, a scene change or a crop change has occurred.

At 510, a determination is made as to whether a set number N of seconds has elapsed. For example, at the initiation of the online meeting, a timer is set such that time N is set to 0. At every 10 seconds (i.e., N=10), the process proceeds to step 520 to determine whether there is any participant within the meeting room that has been identified. If there is no identified participant in the identified participant list information (e.g., pcount=0 or pcount=false), only the participant count is provided as identified participant information as metadata within the current video frame at 525. After step 525, the process ends (i.e., step 470 in the flowchart of FIG. 4 has been completed). If there is at least one identified participant within the meeting room, at 560 the current and/or updated identified participant information (obtained at step 450 and/or step 460) is added as metadata to the current video frame to be compressed and encoded and the process of FIG. 5 ends (i.e., step 470 has been completed).

If N seconds have not yet elapsed at 510, the process next moves to step 530 in which it is determined whether a new participant has been identified (e.g., in step 430), any new speaker has been identified (e.g., in step 440) and/or an identified participant has left the meeting room (based upon tracking movements of the identified participants and/or a determination that the identified participant is no longer within the boundary coordinates of the meeting room). If a new participant has been identified, the updated participant information (obtained at step 450 and/or step 460) is added as metadata to the current video frame to be compressed and encoded and the process of FIG. 5 ends (i.e., step 470 has been completed).

If no new participant has been identified, the process proceeds to step 540 regarding a determination as to whether a location of an identified participant in the meeting room has changed so as to equal or exceed a set distance (e.g., by at least 10%, as determined by the tracking information monitored and maintained for one or more identified participants in the identified participant information list). If there is a determination of a location change for an identified participant that equals or exceeds the set distance, the updated participant information (obtained at step 450 and/or step 460) is added as metadata to the current video frame to be compressed and encoded and the process of FIG. 5 ends (i.e., step 470 has been completed).

If no identified participant has moved at least the set distance, the process continues to step 550 in which it is determined whether there has been any ROI change (e.g., new identified participant enters meeting room, an identified participant has left the meeting room or is no longer in the current scene), any crop and/or any scene change made between the current video frame and a previous video frame (e.g., the immediate previous video frame). If there has been a ROI change, a crop and/or a scene change, the updated participant information (obtained at step 450 and/or step 460) is added as metadata to the compressed and encoded video frame at 560 and the process ends (i.e., step 470 has been completed). If no ROI change, crop change or scene change has been made, the process ends with no participant identifier information being added as metadata to the video frame (i.e., step 470 in the flowchart of FIG. 4 has been completed).

Referring again to FIG. 4, after the process of FIG. 5 is complete, the encoder 220 compresses and encodes the video content, audio content and/or other content (with or without the identified participant information as metadata within the video content) and transmits the data stream via the network(s) 10 to other endpoints engaged in the online meeting.

An example process by which a receiving endpoint (e.g., endpoint 30) engaged in the online meeting receives the data stream from the meeting room endpoint 20 and processes the video content for display is described with reference to the example embodiment of FIG. 3 and the flowchart of FIG. 6. At 610, an endpoint 30 (e.g., a laptop) that is engaged in the online meeting receives the data stream from the meeting room endpoint 20 via the network(s) and, utilizing the decoder 310, decompresses and decodes the video content for display of such video content utilizing the display 32. At 620, the director application 320 of the meeting application module 300 for the endpoint 30 determines, on a video frame-by-frame basis, whether any identifier participant information is provided as metadata within the compressed and encoded video frame. When identifier participant information is present with an associated video frame, such information is extracted from the video frame and analyzed to determine location(s) for one or more identifiers (e.g., name labels) that can be displayed within the video content as well as an identified participant who is a current active speaker. For example, the identified participant information enables an identifier to be provided at a precise location (e.g., at precise location coordinates within the video display) corresponding with an identified participant. Further information, such as identified participant movement beyond a set distance (e.g., 10% or greater change in distance from a baseline location for the identified participant), ROI changes, scene changes and/or crop changes which may also be provided in the identified participant information also enables fine tuning or precise placement of identifiers for identified participants within the displayed video content at the receiving endpoint 30. For video frames containing no identified participant information metadata, the locations of identifiers associated with identified participants can be maintained as established for one or more previous video frames.

At 630, a determination is made at the remote endpoint 30 whether to add any one or more identifiers to the displayed video content. As previously noted, with reference to FIG. 3, identifiers can be name labels (provided, e.g., as text boxes, such as the names Jim, Bill, Ann and Sue associated with the identified/known participants in the meeting room 20). Any other suitable types of identifiers can also be provided for identified/known participants. In example embodiments, the participant at endpoint 30 (e.g., laptop user, mobile phone user, desktop user, etc.) can select whether to add identifiers to all identified participants or to only select identified participants. As previously noted herein, the computing device of endpoint 30 can include a GUI feature associated with the online meeting (e.g., controlled via one or more software applications of the meeting application module 300) which allows the participant to select one or more identified participants to have identifiers associated with such selected participants. For example, a GUI associated with the online meeting and provided at the receiving endpoint 30 may facilitate an option that allows the receiving endpoint participant to choose only the current active speaker or presenter to have an identifier displayed in close proximity to the identified participant.

At 640, a determination is made via one or more software applications of the meeting application module 300 regarding whether any video content is required to be cropped and/or resized based upon participant/computing device user input selection at the receiving endpoint 30. For example, the meeting application module 300 facilitates user input selection (e.g., via the GUI associated with the online meeting) at the receiving endpoint 30 to crop and/or resize any of the video frames to be displayed for the online meeting at display 32. In certain scenarios, the receiving endpoint participant may desire to view a close-up of the current speaking participant and thus crop and/or resize the video content to enlarge the view of the identified speaking participant (where such cropping and/or resizing is in addition to any scene change or cropping/resizing that have already occurred in associating with processing of the video stream feed by the meeting application module 200 at meeting room endpoint 20). In response to user selection at the receiving endpoint 30 to crop and/or resize video content, the display locations of identifiers 34 (as provided in the identified participant information provided as metadata with compressed and encoded video frames) are also modified (e.g., utilizing the director application 320) accordingly based upon changed locations of identified participants within the cropped and/or resized video frames.

At 650, and subsequent to process steps 630 and 640, an identifier 34 (e.g., name label) is placed at a specific location corresponding with each identified participant selected to include such identifier (and further based upon whether any cropping and/or resizing of video content has been performed at the receiving endpoint 30). In the embodiment of FIG. 3, each identified participant has an identifier 34 in the form of a name label provided in close proximity to the identified participant.

Thus, the system and techniques described herein facilitate precise positioning of identifiers associated with known or identified participants in a meeting room for an online meeting, where the identifiers are maintained in close proximity with the identified participants and changes in locations of such identifiers are synchronous with corresponding changes in locations of identified participants within the meeting room and/or with ROI changes, scene changes and/or crop changes performed at the transmission endpoint and/or the receiving endpoint of the video content.

Figure 7:
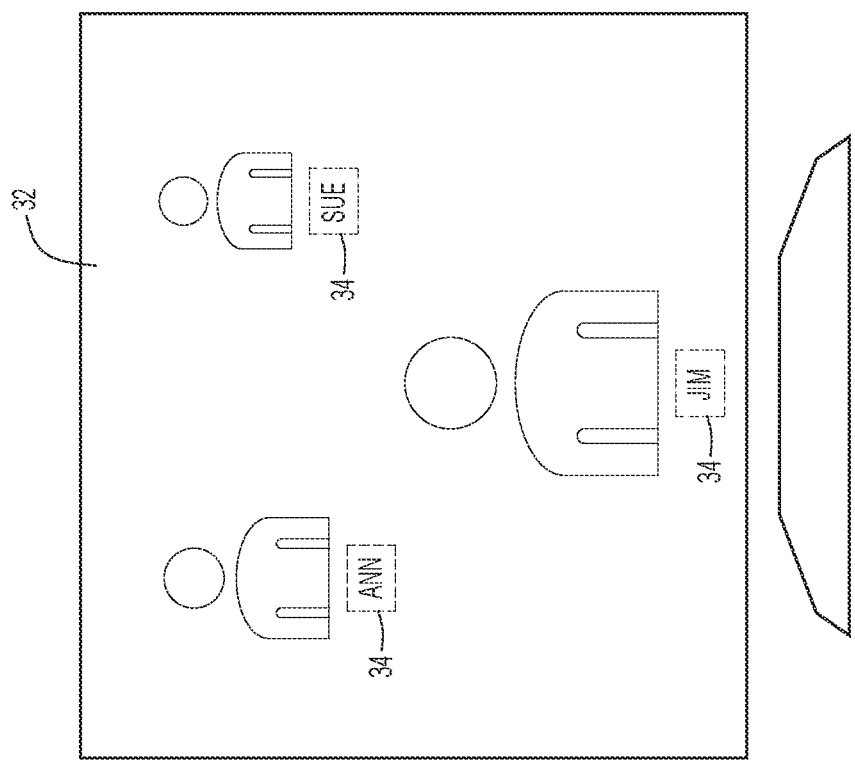
FIG. 7 is a schematic view of the display screen for the endpoint of FIG. 3, in which displayed content has been modified.

For example, as depicted in FIG. 3, when an identified participant (Jim) moves, the identifier 34 associated with the identified participant moves in close proximity and in a frame synchronous manner with the identified participant in the displayed video content by the remote or display 32 of remote content receiving endpoint. Further, as depicted in FIG. 7 (showing an example embodiment of the display 32 for endpoint 30, which is displaying video content at a time subsequent to the displayed video content depicted in FIG. 3), when a cropping and/or resizing of the displayed video content occurs (e.g., enlargement or magnification of the view including the participant Jim, who has been identified, via the meeting application module 200 of the meeting room endpoint 20, as a current active speaker in the online meeting), the identifier 34 associated with each identified participant still within the modified view (e.g., Jim, Ann and Sue) is also adjusted in the display in a synchronous video frame-by-frame manner to correspond and be in close proximity with the identified participant. Even after the scene change or crop change (e.g., magnified view of an ROI), the identifiers (e.g., name labels) remain in close proximity to each identified participant and at the same or substantially similar location. For example, the name label identifier 34 for each identified participant can be provided at a set location directly below the face of each participant (e.g., provided at or near chest level) prior to any resizing/crop change/scene change in any one of more subsequent video frames of the video content, and the name label identifier 34 stays in the same or substantially similar location (i.e., is in the same proximate location) directly below the face of each identified participant (e.g., at or near chest level in the subsequent resized/cropped/scene change video frames of the video content. This is apparent when comparing the displayed content on display 32 in each of FIGS. 3 and 7. Name labels or participant identifiers can be displayed at any suitable locations in proximity or suitable distances to identified participants that facilitate matching or associating a name label with a corresponding identified participant. For example, a name label can be displayed above an identified participant's head, to any side of the identified participant, below an identified participant's face, at any location proximate the identified participant's displayed body, etc. Further, the name label can be displayed in any suitable orientation in relation to the identified participant and other content within a scene. For example, the name label can be arranged or oriented in a horizontal manner, a vertical manner, a diagonal manner and/or any other suitable orientation within the displayed video content.

In the example embodiment of FIG. 7, an identified participant (Bill) is excluded from the modified view due to the enlargement around a ROI including the speaker (Jim). The modification results in the identifier associated with the identified participant excluded from the view being removed in the displayed video content. The removal of an identifier from displayed content would also occur (as previously noted herein) when an identified participant leaves the meeting room.

In further example embodiments, only some of the identified participant information might be sent when certain criteria (e.g., the criteria as set forth in FIG. 5) is satisfied, particularly when such identified participant information has already been sent as metadata in a previous video frame to a receiving endpoint engaged in the online meeting. For example, in a scenario in which an ROI for an identified participant has already been sent as part of the identified participant information as metadata within a video frame from the sending endpoint (e.g., meeting room endpoint 20) to a receiving endpoint (e.g., endpoint 30), subsequent sending of identified participant information that includes the ROI of the same identified participant can exclude, e.g., certain information such as the name of the identified participant. In such a scenario, the receiving endpoint can include a memory cache (e.g., accessible by the direction application 320 of the meeting endpoint 30) that stores some or all of the identified participant information extracted from decoded video frames of the online meeting, where the memory cache can include information from the ROI associated with the identified participant including the participant's name. When the receiving endpoint receives updated identified participant information in one or more video frames, the memory cache can be accessed to retrieve the name and/or any other ROI information relating to the identified participant that may not be provided in the updated identified participant information provided with the most recent video frame. Further, if no change has been made to the ROI information associated with an identified participant between two or more video frames which includes updated identified participant information (e.g., Jim has moved but Ann remains stationary or static within the meeting room), the ROI information provided for the identified participant (Ann) can be very limited (e.g., the ROI information can simply indicate that the identified participant is still present within the meeting room) such that the receiving endpoint can retrieve any additional ROI information from the ROI information associated with the identified participant that has been previously sent and is stored within the memory cache at the receiving endpoint.

An example embodiment is depicted in FIG. 8 of a computer system/computing device 800 that can be implemented for use at any of the meeting room 20 and meeting endpoints 30 in the system 2 of FIG. 1 and further includes hardware and software components that facilitate engaging in an online meeting with other endpoints and performing operations associated with the online meeting as previously described herein. The computing device 800 includes a bus 802 or other communication mechanism for communicating information, and a processor 803 coupled with the bus 802 for processing the information. While the figure shows a single block for a processor, it should be understood that any number of processors 803 can be provided representing a plurality of processing cores, each of which can perform separate processing. The computing device 800 also includes a main memory 804, such as a random access memory (RAM) or other dynamic storage device (e.g., dynamic RAM (DRAM), static RAM (SRAM), and synchronous DRAM (SD RAM)), coupled to the bus 802 for storing information and instructions to be executed by processor 803. In addition, the main memory 804 may be used for storing temporary variables or other intermediate information during the execution of instructions by the processor 803. Moreover, the main memory 804 may also be used for storing a meeting application module 818, which includes any one or more software applications associated with initiating, performing operations during, and terminating an online meeting (e.g., meeting application module 200, 300), which may be executed by the processor 803. The computing device 800 further includes a read only memory (ROM) 805 or other static storage device (e.g., programmable ROM (PROM), erasable PROM (EPROM), and electrically erasable PROM (EEPROM)) coupled to the bus 802 for storing static information and instructions for the processor 803.

The computing device 800 also includes a disk controller 806 coupled to the bus 802 to control one or more storage devices for storing information and instructions, such as a magnetic hard disk 807, and a removable media drive 808 (e.g., floppy disk drive, read-only compact disc drive, read/write compact disc drive, compact disc jukebox, tape drive, and removable magneto-optical drive). The storage devices may be added to the computer system 1080 using an appropriate device interface (e.g., small computer system interface (SCSI), integrated device electronics (IDE), enhanced-IDE (E-IDE), direct memory access (DMA), or ultra-DMA).

The computing device 800 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, comprise types of processing circuitry. The processing circuitry may be located in one device or distributed across multiple devices.

The computing device 800 also includes a speaker controller 820 to control one or more speakers 810. Also included is a display controller 809 coupled to the bus 802 to control a display (e.g., display 26 for meeting room 20, or a display 32 for endpoint 30, such as a liquid crystal display (LCD), light emitting diode (LED) display, for displaying information to a computer user. The computing device 800 includes input devices, such as a keyboard 811, and a pointing device 812 for interacting with a computer user and providing information to the processor 803. The pointing device 812, e.g., may be a mouse, a trackball, or a pointing stick for communicating direction information and command selections to the processor 803 and for controlling cursor movement on the display 26, 32. A further provided input device comprises one or more microphones (e.g., a microphone array 24 as described for meeting room 20), where the information provided by the microphone(s) can also be provided for use by the processor and one or more software applications of the meeting application module 818 (e.g., to determine which identified participant is the current speaker as previously described herein).

The computing device 800 performs a portion or all of the processing steps of the process in response to the processor 803 executing one or more sequences of one or more instructions contained in a memory, such as the main memory 804. Such instructions may be read into the main memory 804 from another computer readable medium, such as a hard disk 807 or a removable media drive 808. One or more processors in a multi-processing arrangement may also be employed to execute the sequences of instructions contained in main memory 804. In alternative embodiments, hard-wired circuitry may be used in place of or in combination with software instructions. Thus, embodiments are not limited to any specific combination of hardware circuitry and software.

As stated above, the computing device 800 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the computing device 800, for driving a device or devices for implementing the process, and for enabling the computing device 800 to interact with a human user. Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computing device 800 also includes a communication interface 813 coupled to the bus 802. The communication interface 813 provides a two-way data communication coupling to a network link 814 that is connected to, for example, a local area network (LAN) 816 and/or to one or more networks 10 (e.g., the Internet). For example, the communication interface 813 may be a wired or wireless network interface card to attach to any packet switched (wired or wireless) LAN. As another example, the communication interface 813 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 813 sends and receives electrical, electromagnetic or optical signals that carry digital data streams representing various types of information.

The network link 814 typically provides data communication through one or more networks to other data devices. For example, the network link 814 may provide a connection to another computer through a local area network 816 (e.g., a LAN) or through equipment operated by a service provider, which provides communication services through one or more communications networks 10. The network link 814 and the communications network(s) 10 use, for example, electrical, electromagnetic, or optical signals that carry digital data streams, and the associated physical layer (e.g., CAT 5 cable, coaxial cable, optical fiber, etc.). The signals through the various networks and the signals on the network link 814 and through the communication interface 813, which carry the digital data to and from the computing device 800, maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computing device 800 can transmit and receive data, including program code, through the network(s) 816 and 10, the network link 814 and the communication interface 813. Moreover, the network link 814 may provide a connection through network 816 to an endpoint 20, 30 where, as previously noted herein, endpoints can comprise a video conferencing system or meeting room (e.g., a telepresence room), a personal digital assistant (PDA), a laptop or desktop computer, or a mobile or cellular telephone.

Thus, example embodiments include a method comprising analyzing captured video content generated at an endpoint during an online meeting. A participant is identified at the endpoint from the captured video content utilizing face recognition analysis of an isolated facial image of the participant within the video content. Identified participant information is generated, modified and/or maintained in response to one or more changes associated with the captured video content, where the one or more changes comprises one or more of the following: an identification of each participant at the endpoint, and a change in location of one or more identified participants at the endpoint. In response to a determination of one or more criteria being satisfied, the identified participant information is provided in video content for transmission to a remote endpoint.

During the online meeting, the method can further comprise analyzing captured audio content generated at an endpoint, identifying a current speaker at the endpoint based upon the captured audio content, and determining an identified participant that is the current speaker at the endpoint based upon a comparison of the captured audio content and the captured video content. The generating, modifying and/or maintaining identified participant information can further be in response to determining an identified participant that is the current speaker at the endpoint.

The one or more changes can further comprise one or more of the following: a scene change for one or more video frames within the captured video content, and a crop change for one or more video frames within the captured video content.

The identified participant information can be provided in video content in response to a determination of the one or more criteria being satisfied on a video frame-by-frame basis.

The one or more criteria can comprise one or more of the following: a set time interval has elapsed, any newly identified participant at the endpoint, movement of an identified participant that changes by a set distance, identification of a new speaker at the endpoint, a scene change for one or more video frames within the captured video content, and a crop change for one or more video frames within the captured video content.

The method can further comprise receiving the audio and video content at the remote endpoint and extracting identified participant information from the video content, and displaying the video content at the remote endpoint, wherein the displayed video content includes a name identifier displayed proximate an identified participant.

Based upon user selection at the remote endpoint, the displayed video content can include a name identifier displayed proximate each identified participant that is selected by a user at the remote endpoint. Based upon user selection at the remote endpoint, the displayed video content can also include only a name identifier displayed proximate an identified participant that is determined to be the current speaker. In addition, the name identifier can remain displayed proximate the identified participant after a crop change or a scene change of one or more video frames including the identified participant.

In other example embodiments, an apparatus comprises memory configured to store instructions including one or more applications that support online meetings with endpoints over a network, a display to display video content during an online meeting, one or more cameras to capture video content at an endpoint during the online meeting, a communication interface configured to enable communications over a network, and a processor to execute and control operations of the one or more applications so as to perform the following operations: during the online meeting, analyze captured video content from the one or more cameras, identify a participant at the endpoint from the captured video content utilizing face recognition analysis of an isolated facial image of the participant within the captured video content, generate, modify and/or maintain identified participant information in response to one or more changes associated with the captured video content, where the one or more changes comprises one or more of the following: an identification of each participant at the endpoint, a change in location of one or more identified participants at the endpoint, a change in a region of interest (ROI) within the captured video content, a scene change for one or more video frames within the captured video content, and a crop change for one or more video frames within the captured video content, and, in response to a determination of one or more criteria being satisfied, provide the identified participant information in video content for transmission over the network to a remote endpoint. The identified participant information is provided in the video content in response to a determination of the one or more criteria being satisfied on a video frame-by-frame basis.

In further example embodiments, one or more computer readable storage media encoded with software comprising computer executable instructions and when the software is executed operable to: during an online meeting, analyze captured video content and captured audio content generated at an endpoint, identify a current speaker at the endpoint based upon the captured audio content, identify a participant at the endpoint from the captured video content utilizing face recognition analysis of an isolated facial image of the participant within the captured video content, determine an identified participant that is the current speaker at the endpoint based upon a comparison of the captured audio content and the captured video content, generate, modify and/or maintain identified participant information in response to one or more changes associated with the captured video content, where the one or more changes comprises one or more of the following: an identification of each participant at the endpoint, a change in location of one or more identified participants at the endpoint, and a determination of an identified participant that is the current speaker at the endpoint, and, in response to a determination of one or more criteria being satisfied, provide the identified participant information in video content for transmission to a remote endpoint.

The above description is intended by way of example only.

What is claimed is:
1. A method comprising:
during an online meeting, analyzing video content and audio content generated within a meeting room at an endpoint, wherein the video content is captured via one or more cameras within the meeting room, and the audio content is captured via one or more microphones within the meeting room;

identifying a plurality of participants within the meeting room from the video content utilizing face recognition analysis of an isolated facial image of each participant within the video content;

determining an identified participant as a current speaker at the endpoint based upon an analysis of the video content and the audio content;

determining a region of interest (ROI) within the video content that includes the current speaker;

adjusting the video content captured by the one or more cameras based upon the ROI, wherein the adjusting comprises cropping the video content and/or making a scene change that comprises switching from one camera to another camera in the meeting room to capture a camera view in the video content;

generating, modifying and/or maintaining identified participant information in response to one or more changes associated with the video content and/or the audio content, wherein the one or more changes comprises one or more of the following: an identification of each new participant at the endpoint, a determination of a newly identified participant as the current speaker at the endpoint, and a change in location of one or more identified participants at the endpoint;

determining, for each video frame of video content, whether one or more criteria has been satisfied based upon the one or more changes associated with the video content and/or the audio content;

in response to a determination of one or more criteria being satisfied for an individual video frame of video content, providing the identified participant information with the individual video frame of video content for transmission to a remote endpoint; and in response to a determination of none of the one or more criteria being satisfied for the individual video frame of video content, excluding the identified participant information from being provided with the individual video frame of video content for transmission to the remote endpoint such that subsequent providing of identified participant information excludes some previously provided information for one or more identified participants.

2. The method of claim 1, wherein the one or more microphones comprises a plurality of microphones, and the analysis comprises mapping audio content captured by at least one of the plurality of microphones with a spatial location within the meeting room.

3. The method of claim 1, wherein the one or more changes further comprises one or more of the following: a scene change for one or more video frames within the video content, and a crop change for one or more video frames within the video content.

4. The method of claim 1, wherein the one or more criteria comprises one or more of the following: a set time interval has elapsed, any newly identified participant in the meeting room at the endpoint, movement of an identified participant that changes by a set distance, identification of a new speaker at the endpoint, a scene change for one or more video frames within the video content, and a crop change for one or more video frames within the video content.

5. The method of claim 4, further comprising:

receiving the video content at the remote endpoint and extracting identified participant information from the video content; and displaying the video content at the remote endpoint, wherein displayed video content includes a name identifier displayed proximate an identified participant.

6. The method of claim 5, wherein the displayed video content, based upon user selection at the remote endpoint, includes a name identifier displayed proximate each identified participant that is selected by a user at the remote endpoint.

7. The method of claim 5, wherein the displayed video content, based upon user selection at the remote endpoint, includes only a name identifier displayed proximate an identified participant that is determined to be the current speaker.

8. The method of claim 5, wherein the name identifier remains displayed proximate the identified participant after a crop change or a scene change of one or more video frames including the identified participant.

9. An apparatus comprising:

a memory configured to store instructions including one or more applications that support online meetings with endpoints over a network;

a display to display video content during an online meeting;

one or more cameras to capture video content within a meeting room at an endpoint during the online meeting;

one or more microphones to capture audio content within the meeting room at the endpoint during the online meeting;

a communication interface configured to enable communications over a network; and a processor to execute and control operations of the one or more applications so as to:

during the online meeting, analyze video content captured from the one or more cameras and audio content captured from the one or more microphones within the meeting room;

identify a plurality of participants within the meeting room at the endpoint from the video content utilizing face recognition analysis of an isolated facial image of each participant within the video content;

determine an identified participant as a current speaker at the endpoint based upon an analysis of the audio content and the video content;

determine a region of interest (ROI) within the video content that includes the current speaker;

adjust the video content captured by the one or more cameras based upon the ROI, wherein the adjusting comprises cropping the video content and/or making a scene change that comprises switching from one camera to another camera in the meeting room to capture a camera view in the video content;

generate, modify and/or maintain identified participant information in response to one or more changes associated with the video content and/or the audio content, wherein the one or more changes comprises one or more of the following: an identification of each new participant at the endpoint, a determination of a newly identified participant as the current speaker at the endpoint, a change in location of one or more identified participants at the endpoint, a scene change for one or more video frames within the video content, and a crop change for one or more video frames within the video content;

determine, for each video frame of video content, whether one or more criteria has been satisfied based upon the one or more changes associated with the video content and/or the audio content;

in response to a determination of one or more criteria being satisfied for an individual video frame of video content, provide the identified participant information within the individual video frame of video content for transmission over the network to a remote endpoint; and in response to a determination of none of the one or more criteria being satisfied for the individual video frame of video content, excluding the identified participant information from being provided with the individual video frame of video content for transmission to the remote endpoint such that subsequent providing of identified participant information excludes some previously provided information for one or more identified participants.

10. The apparatus of claim 9, wherein the one or more microphones comprises a plurality of microphones, and the analysis comprises mapping audio content captured by at least one of the plurality of microphones with a spatial location within the meeting room.

11. The apparatus of claim 9, wherein the one or more criteria comprises one or more of the following: a set time interval has elapsed, any newly identified participant at the endpoint, movement of an identified participant that changes by a set distance, identification of a new speaker at the endpoint, a scene change for one or more video frames within the video content, and a crop change for one or more video frames within the video content.

12. One or more non-transitory computer readable storage media encoded with software comprising computer executable instructions and when the software is executed operable to:

during an online meeting, analyze video content and audio content generated within a meeting room at an endpoint, wherein the video content is captured via one or more cameras within the meeting room, and the audio content is captured via one or more microphones within the meeting room;

identify a plurality of participants in the meeting room at the endpoint from the video content utilizing face recognition analysis of an isolated facial image of each participant within the video content;

determine an identified participant as a current speaker at the endpoint based upon an analysis of the audio content and the video content;

determine a region of interest (ROI) within the video content that includes the current speaker;

adjust the video content captured by the one or more cameras based upon the ROI, wherein the adjusting comprises cropping the video content and/or making a scene change that comprises switching from one camera to another camera in the meeting room to capture a camera view in the video content;

generate, modify and/or maintain identified participant information in response to one or more changes associated with the video content and/or the audio content, wherein the one or more changes comprises one or more of the following: an identification of each new participant at the endpoint, a change in location of one or more identified participants at the endpoint, and a determination of a newly identified participant as the current speaker at the endpoint;

determine, for each video frame of video content, whether one or more criteria has been satisfied based upon the one or more changes associated with the video content and/or the audio content;

in response to a determination of one or more criteria being satisfied for an individual video frame of video content, provide the identified participant information with the individual video frame of the video content for transmission to a remote endpoint; and in response to a determination of none of the one or more criteria being satisfied for the individual video frame of video content, exclude the identified participant information from being provided with the individual video frame of video content for transmission to the remote endpoint such that subsequent providing of identified participant information excludes some previously provided information for one or more identified participants.

13. The non-transitory computer readable storage media of claim 12, wherein the one or more changes further comprises one or more of the following: a scene change for one or more video frames within the video content, and a crop change for one or more video frames within the video content.

14. The non-transitory computer readable storage media of claim 12, wherein the one or more criteria comprises one or more of the following: a set time interval has elapsed, any newly identified participant at the endpoint, movement of an identified participant that changes by a set distance, identification of a new speaker at the endpoint, a scene change for one or more video frames within the video content, and a crop change for one or more video frames within the video content.

15. The non-transitory computer readable storage media of claim 14, wherein the instructions are further operable to:
receive the audio content and the video content at the remote endpoint and extract identified participant information from the video content; and
display the video content at the remote endpoint, wherein displayed video content includes a name identifier displayed proximate an identified participant.

16. The non-transitory computer readable storage media of claim 15, wherein the name identifier remains displayed proximate the identified participant after a crop change or a scene change of one or more video frames including the identified participant.

17. The non-transitory computer readable storage media of claim 15, wherein the displayed video content, based upon user selection at the remote endpoint, includes a name identifier displayed proximate each identified participant that is selected by a user at the remote endpoint.

18. The non-transitory computer readable storage media of claim 15, wherein the displayed video content, based upon user selection at the remote endpoint, includes only a name identifier displayed proximate an identified participant that is determined to be the current speaker.

* * * * *